(12) United States Patent
Song et al.

(10) Patent No.: US 7,532,007 B2
(45) Date of Patent: May 12, 2009

(54) REMOTE SENSING NUCLEAR MAGNETIC RESONANCE APPARATUS

(75) Inventors: Yi-Qiao Song, Ridgefield, CT (US); Pabitra Narayan Sen, Chapel Hill, NC (US)

(73) Assignee: Schlumberger Technology Corporation, Ridgefield, CT (US)

( * ) Notice: Subject to any disclaimer, the term of this patent is extended or adjusted under 35 U.S.C. 154(b) by 78 days.

(21) Appl. No.: 11/608,890

(22) Filed: Dec. 11, 2006

(65) Prior Publication Data

US 2008/0136410 A1 Jun. 12, 2008

Related U.S. Application Data

(63) Continuation-in-part of application No. 11/608,469, filed on Dec. 8, 2006.

(51) Int. Cl.
*G01V 3/00* (2006.01)
(52) U.S. Cl. ......................... 324/303; 324/306
(58) Field of Classification Search ................. 324/303, 324/306
See application file for complete search history.

(56) References Cited

U.S. PATENT DOCUMENTS

| | | | |
|---|---|---|---|
| 5,055,787 A * | 10/1991 | Kleinberg et al. ............ 324/303 |
| 6,111,408 A * | 8/2000 | Blades et al. ................ 324/303 |
| 6,518,758 B1 | 2/2003 | Speier et al. |
| 6,528,995 B1 | 3/2003 | Speier et al. |
| 6,531,869 B1 | 3/2003 | Speier et al. |
| 6,538,438 B1 | 3/2003 | Speier et al. |
| 6,642,715 B2 | 11/2003 | Speier et al. |
| 6,710,596 B2 | 3/2004 | Speier et al. |
| 6,737,864 B2 * | 5/2004 | Prammer et al. ............ 324/303 |
| 6,856,132 B2 | 2/2005 | Appel et al. |
| 7,061,237 B2 | 6/2006 | Pines et al. |
| 7,180,288 B2 | 2/2007 | Scheven |

OTHER PUBLICATIONS

Horkowitz, John P. et al., Residual Oil Saturation Measurements in Carbonates with Pulsed NMR Logs, The Log Analyst, Mar.-Apr. 1997, pp. 73-83.
Granwehr, J. et al., Time-of-Flight Flow Imaging Using NMR Remote Detection, Physical Review Letters, 95, 075503, 2005.
Seeley, Juliette et al., Remotely Detected High-Field MRI of Porous Samples, Journal of Magnetic Resonance, 167, pp. 282-290, 2004.

(Continued)

*Primary Examiner*—Louis M Arana
(74) *Attorney, Agent, or Firm*—James McAleenan; Jody DeStefanis; Vincent Loccisano

(57) ABSTRACT

An apparatus and methods that can be used to determine various qualitative parameters of an earth formation from nuclear magnetic resonance (NMR) measurements. One embodiment provides a method of NMR-based remote sensing in which a nuclear spins in fluid of interest are encoded while inside an earth formation and then withdrawn into a tool module and analyzed by a sensor located in the tool module. Separate encoding and detection systems may be used, allowing each system to be independently optimized. In particular, because detection of the encoded spins may occur while the spins are inside the detector system, rather than within the earth formation (where they are encoded), the detector system may be constructed to employ a highly uniform magnetic field. This may facilitate various NMR measurements.

23 Claims, 4 Drawing Sheets

OTHER PUBLICATIONS

Moule, Adam J. et al., Amplification of Xenon NMR and MRI by Remote Detection, Proceedings of the National Academy of Sciences of the United States of America, Aug. 2003, vol. 100, No. 16, pp. 9122-9127.

Underbalanced Drilling Overview, http://www.rigzone.com/news/insight/insight.asp?i_id=26, 2007.

Halbach, Physical and Optical Properties of Rare Earth Cobalt Magnets, Nuclear Instruments and Methods 187 (1981) 109-117.

Halbach, Design of Permanent Multipole Magnets with Oriented Rare Earth Cobalt Material, Nuclear Instruments and Methods 169 (1980) 1-10.

* cited by examiner

REMOTE SENSING NUCLEAR MAGNETIC RESONANCE APPARATUS

REFERENCES TO RELATED APPLICATIONS

This application is a continuation in part of U.S. patent application Ser. No. 11/608,469, filed Dec. 8, 2006, which is hereby incorporated by reference as if set forth fully herein.

BACKGROUND

1. Field of the Invention

The present invention relates to an apparatus and methods for measuring flow velocity and other parameters in an earth formation using nuclear magnetic resonance techniques.

2. Discussion of Related Art

Well logging provides information about many important parameters that may be used to determine the "quality or characteristics" of an earth formation from wellbore measurements including, for example, the amount and producibility of hydrocarbons present in the formation. In addition to wireline logging, downhole formation sampling tools such s the Schlumberger Modular Formation Dynamics Tester (MDT) may be used to withdraw samples of fluids from earth formations for subsequent analyses. These analyses provide information to characterize physical properties of the formation fluids such as water and oil volume fractions, oil viscosity and water salinity. Knowledge of these and other physical characteristics may be needed to interpret wireline logs and to plan for the efficient exploitation of the reservoir.

Nuclear magnetic resonance (NMR) has become an invaluable tool for the characterization of materials and is widely used in geophysical exploration. NMR measurements, in general, are accomplished by causing the magnetic moments of nuclei ("spins") in a formation to precess about an axis. The axis about which the nuclei precess may be established by applying a strong, polarizing, static magnetic field ($B_0$) to the formation to align the proton spins. Next, a series of radio frequency (RF) pulses are produced so that an oscillating magnetic field $B_1$ is applied. One common sequence of RF pulses that may be used is the error-correcting CPMG (Carr-Purcell-Meiboom-Gill) NMR pulse sequence. The frequency of the RF pulses may be chosen to excite specific nuclear spins, for example, water protons or Carbon-13 nuclei, in a particular region of interest of a sample.

Various NMR techniques have been used to measure formation parameters such as the spin-lattice relaxation time ($T_1$), the spin-spin relaxation time ($T_2$) and the diffusion coefficient (D). One important parameter is the permeability of the formation as this parameter may provide an indication of the difficulty that may be encountered in extracting the hydrocarbons from the formation. In some cases, NMR measurements can be used to create $T_2$ distributions which represent pore size distributions in the formation, and permeability can be derived from these $T_2$ distributions. However, this method of determining permeability suffers from several drawbacks and is not always applicable.

A more direct way to measure permeability uses measurements of induced flow rates of fluid in the formation. Several NMR-based flow measurement techniques have been proposed. For example, U.S. Pat. No. 6,518,758 to Speier et al. describes an NMR/MRI (magnetic resonance imaging) technique for measuring flow velocity in a wellbore based on frequency displacement (echo shape) of a received signal. U.S. Pat. No. 6,856,132 to Appel et al. describes another flow measurement technique that is based on creating at least two MRI images, at two different times, of the fluid flowing within the formation. The images are used to determine displacement of the fluid. In the methods of both the '758 and '132 patents, the spins are measured while they remain within the formation.

An apparatus incorporating remote detection NMR/MRI spectroscopy is disclosed in U.S. Pat. No. 7,061,237 to Pines et al. The '237 patent discloses an NMR apparatus including an encoding coil with a sample chamber, a supply of signal carriers, preferably hyperpolarized xenon, and a detector. According to the '237 patent, the apparatus allows the spatial and temporal separation of the encoding and detection steps, which allows the conditions of each step to be optimized depending on the subject of investigation. However, the '237 does not disclose the use of NMR in downhole applications, but instead discloses only surface applications, primarily in laboratories or medical facilities.

SUMMARY OF INVENTION

Aspects and embodiments of the invention are directed to a nuclear magnetic resonance (NMR) technique to image fluid flow within a sample such as a rock formation. In one example, the fluid flow may be induced by a pump, optionally a pump module incorporated into the same tool that may include the NMR apparatus. In one embodiment, the NMR signal may be coded while the spins are within the formation, but the signal may be detected and analyzed after a fluid sample (that includes encoded spins) from the formation has been withdrawn into the tool body. Because detection occurs at a different spatial location (e.g., inside the detector) than does the encoding (e.g., inside the formation), this technique may be referred to as remote sensing NMR or remote detection NMR. The time taken for the encoded fluid to enter the detector may provide a measure of the flow. Different fluid types may be resolved in the detector, thereby yielding flow geometry for individual fluids and their volume fractions giving, among other parameters, a measure of relative permeability of the formation. Spatially and chemically resolved velocity and displacement distribution can be obtained, as discussed below.

According to one embodiment, a down-hole remote sensing NMR apparatus may comprise an encoding subsystem including an encoding magnet assembly constructed and arranged to project an encoding magnetic field into an earth formation to encode nuclear spins in the earth formation, and a detector subsystem including a detector magnet assembly constructed and arranged to generate a magnetic field, wherein the detection subsystem is spatially separated from the encoding subsystem, wherein the detection subsystem comprises at least one RF coil coupled to the magnet assembly, and wherein the detection subsystem is constructed and arranged to generate a series of RF magnetic pulses to detect the encoded nuclear spins. In one example, the encoding magnet assembly may be constructed and arranged to generate a non-uniform static magnetic field. In another example, the encoding subsystem may comprise at least one radio frequency (RF) coil coupled to the encoding magnet assembly so as to generate an RF magnetic field having a non-zero component that is perpendicular to the static magnetic field. In one example, detector subsystem may comprise a sample chamber that is constructed and arranged to hold a sample containing the encoded nuclear spins, and the detector magnet assembly may be constructed and arranged to generate a substantially uniform magnetic field in the sample chamber. The detector magnet assembly may alternatively be constructed and arranged to generate in the sample chamber a magnetic field having a known magnetic field gradient. In another example, either or both of the encoding subsystem and the detector subsystem may include a pulsed field gradient module.

In one embodiment, the down-hole remote sensing nuclear magnetic resonance apparatus as described above may be incorporated into a down-hole tool that also includes a pump module constructed and arranged to induce flow of the fluid from the formation through a tool flow line to the detector subsystem, where the sample chamber of the detector subsystem is constructed around the flow line (or around a branch of the flow line).

According to another embodiment, a method of remote sensing nuclear magnetic resonance measurement may comprise steps of encoding at a first location nuclear spins in fluid in an encoding volume of a sample to provide encoded spins, transporting the fluid containing the encoded spins to a second location remote from the first location, detecting the encoded spins at the second location, and determining a flow velocity of the fluid based on a time taken for the encoded spins to travel from the encoding volume to the second location. In one example, encoding may include generating a magnetic field to encode the nuclear spins. In another example, the first location may be an earth formation and the encoding may include projecting the magnetic field into the earth formation to encode the nuclear spins in the fluid in the encoding volume of the earth formation. Furthermore, transporting may include inducing flow of the fluid in the earth formation. In another example, detecting may include generating a series of radio frequency magnetic pulses to detect the encoded spins. In one embodiment, the second location may be a sample chamber within a detector that generates the series of radio frequency magnetic pulses, and detecting may further comprise generating a substantially uniform magnetic field surrounding the encoded spins in the sample chamber. In another example, encoding may include generating a radio frequency magnetic field at a Lamor frequency selected to encode nuclear spins within a selected slice of the encoding volume. In some embodiments, encoding may further comprise generating magnetic gradient pulses to further encode the nuclear spins within the selected slice.

Another embodiment is directed to a method of measuring flow velocity of a fluid in an earth formation. The method may comprise steps of inducing the flow of the fluid, encoding nuclear spins in the fluid within an encoding volume of the earth formation to provide encoded spins, causing the fluid containing the encoded spins to flow from the earth formation through a flow line to a detector, detecting the encoded spins at the detector by generating a series of radio frequency magnetic pulses to detect the encoded spins, and determining the flow velocity by determining a time taken for the encoded spins to arrive at the detector. In one example, encoding may include generating a magnetic field to invert the nuclear spins in the encoding volume. In another example, encoding may include generating a radio frequency magnetic field at a Lamor frequency selected to encode the nuclear spins within a selected slice within the encoding volume. Furthermore the steps of encoding, causing the flow and detecting may be repeated for different Lamor frequencies in the encoding step. In another example, once the flow velocity is obtained, other information about the formation and/or the fluid may also be obtained. In some cases, the fluid may be a multi-phase fluid and this information may include, for example, at least one of a permeability of the encoding volume of the earth formation, a movable water fraction, a bound water fraction, and a relative permeability for at least one phase of the multi-phase fluid.

BRIEF DESCRIPTION OF THE DRAWINGS

Various aspects and embodiments of the invention are described below with reference to the accompanying figures. In the drawings, which are not intended to be drawn to scale, each identical or nearly identical component that is illustrated in various figures is represented by a like numeral. For purposes of clarity, not every component may be labeled in every drawing. In the drawings.

DETAILED DESCRIPTION

Figure 1:
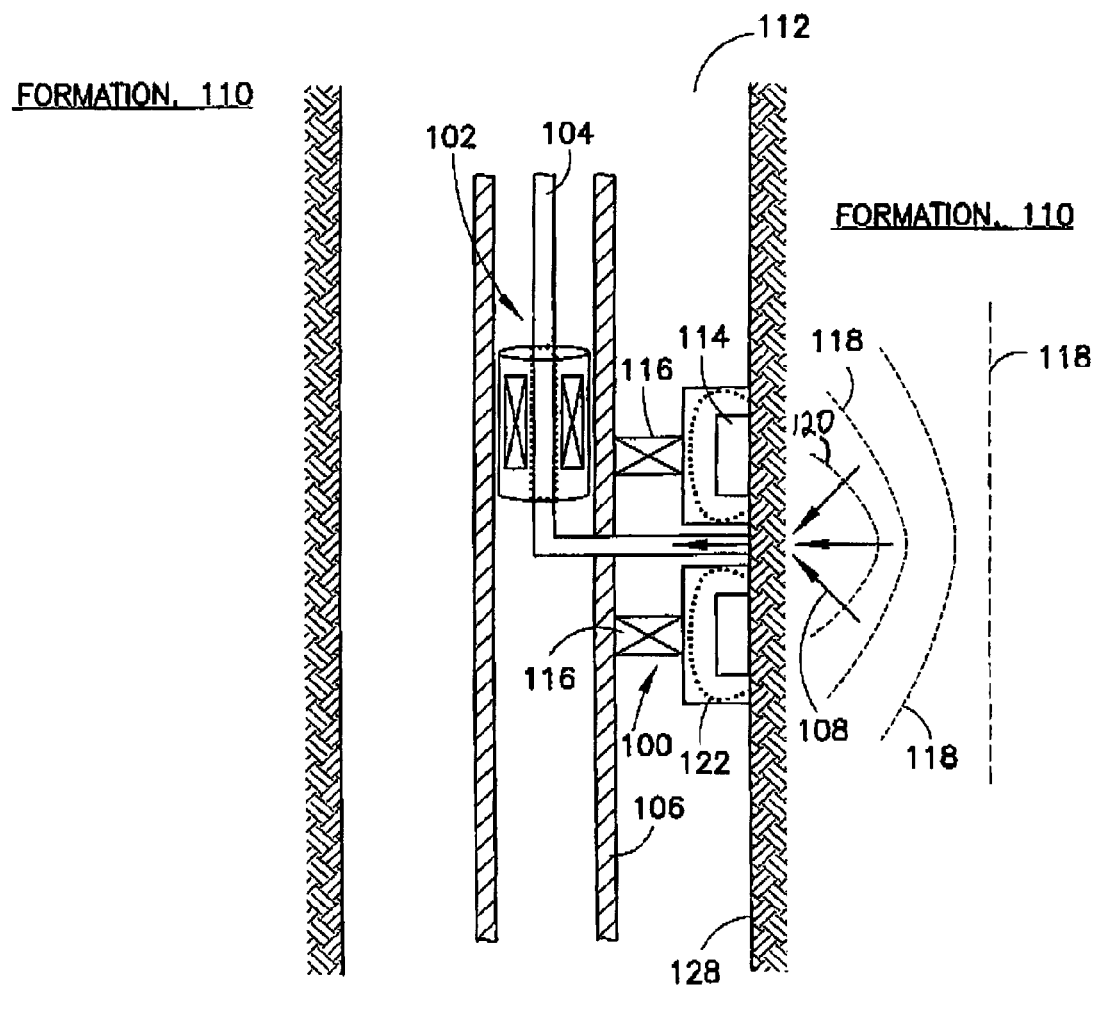
FIG. 1 is a functional block diagram of one embodiment of an NMR apparatus.

Aspects and embodiments of the invention are directed to methods and apparatus that can be used to determine various qualitative parameters of an earth formation from nuclear magnetic resonance (NMR) measurements. One embodiment provides a method of NMR-based remote sensing in which a fluid of interest is "tagged" while inside an earth formation and then withdrawn into a tool module and analyzed by a sensor located in the tool module. This method may be used to identify and quantify fluids in the earth formation. According to some embodiments, the method and apparatus may be used to characterize the fluid flow in the earth formation for either single phase or multi-phase fluids and, in the case of multi-phase fluids, to determine the relative permeability of the earth formation. These and other aspects and embodiments of the invention are discussed below in more detail.

It is to be appreciated that this invention is not limited in its application to the details of construction and the arrangement of components set forth in the following description or illustrated in the drawings. The invention is capable of other embodiments and of being practiced or of being carried out in various ways. For example, it is to be appreciated that the method apparatus described herein is not limited to use in wellbores and may be used in a variety of environments and applications. Examples of specific implementations are provided herein for illustrative purposes only and are not intended to be limiting. In particular, acts, elements and features discussed in connection with one embodiment are not intended to be excluded from a similar role in other embodiments. Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

NMR measurements can be considered as two step processes. The first step includes the manipulation of nuclear spins, for example, by a series of RF and/or magnetic field gradient pulses. In the second step, the resulting spin magnetization is detected. The first step is often called encoding step since it is meant to modulate the spins in certain patterns. Usually, a systematic sequence of the pulses is executed, for example, an inversion-recovery CPMG sequence as discussed above, and the corresponding signal is measured during the detection step. The detected signal arises as a result of a known pattern of modulation that is applied during the encoding step. Therefore, analysis of the detected signal allows the extraction of the properties of the nuclear spins and the spin-containing materials. In case of magnetic resonance imaging, for example, the combination of field gradient and RF pulses allow the measurement of the spatial Fourier components of the image. A Fourier inversion of the data (in the Fourier space) reconstructs an original image of the sample.

In conventional NMR, both encoding of the sample volume and detection of the resulting signal are done while the spins are within the sample and in the same, or very nearly the same, location. For example, in the conventional methods discussed above the spins are both encoded and detected while still inside the earth formation. Thus, one factor limiting the application of NMR for field measurements is that the sample is outside the NMR instrument, causing a very poor filling factor and resulting in a low signal-to-noise ratio. In addition, in many cases, the same RF coil is used for both encoding and detection, thus limiting the ability to tune the system for high resolution detection. To overcome these limitations, embodiments of the invention spatially separate the encoding and detection steps by employing two independent NMR subsystems to execute the encoding and detection separately. This is referred to herein as "remote detection" or "remote sensing NMR" because analysis of the spins in the detection step may be performed at a location that is remote from the location where the spins were encoded.

According to one embodiment, a method of remote sensing NMR may be used to measure fluid flow in an earth formation. The fluid flow may be created using, for example, a pump such as the Schlumberger MDT pump module. Therefore, in one embodiment, an NMR apparatus may be combined with or coupled to a downhole tool, such as the MDT tool, to perform downhole NMR measurements, including flow rate measurements. It is to be appreciated, however, that the invention is not limited to use in combination with the MDT tool and may be used with a variety of other pump modules that may create fluid flow. In addition, an NMR apparatus in accordance with principles of the invention may be used in circumstances where the fluid is naturally flowing and no pump module may be needed. Furthermore, although various embodiments of the invention are described below in connection with wellbore operation, the invention is not limited to use in wellbores and the principles of the invention may be applied to a variety of applications, as would be recognized by those skilled in the art.

According to one embodiment, an NMR apparatus that may be used to measure fluid flow may include an encoding subsystem and a detection subsystem which may be spatially separated and which may operate in synchronization. Each of the two NMR subsystems may be able to generate and transmit RF currents to respective magnetic coils to irradiate the samples with magnetic field pulses to manipulate the nuclear spins. The encoding subsystem may generate a magnetic field to encode nuclear spins in fluid within a selected region of a sample or earth formation, as discussed further below. After this encoding step, a sample of the fluid including the encoded spins maybe removed from the formation (e.g., withdrawn into the tool body) and analyzed in a highly optimized detection subsystem. The detection subsystem may be used to monitor the signal from the fluid that is being pumped from the formation (where it was encoded) into the detector. Deviation from the steady state signal in the detector may be due to the spins that were manipulated (encoded) by the encoding subsystem. In one embodiment, the time taken for the encoded spins to arrive at the detector may provide an indication of the flow velocity of the fluid, as discussed further below. In addition, according to some embodiments, the detector may be designed to perform additional NMR measurements analyses of the fluid to provide information beyond the flow velocity, as discussed further below. The measurement may be repeated with different NMR parameters for the encoding subsystem to allow spatial resolution of the fluid within the formation.

Referring to FIG. 1, there is illustrated one embodiment of a well-logging device including a remote sensing NMR apparatus according to aspects of the invention. The NMR apparatus includes an encoding subsystem 100 and a detection subsystem 102. For well logging applications, the NMR apparatus may be coupled to a downhole tool (e.g., the MDT tool), not shown in detail but indicated by reference numeral 106, located in a wellbore 112 in a formation 110. The tool may include a pump module (not shown) to induce fluid flow in the formation. In one embodiment, the detection subsystem 102 may be coupled to a flow line 104 that carries fluid from the formation into the tool body. The encoding subsystem 100 may generate a magnetic field and RF pulses to encode the spins in a volume of fluid (called the encoding volume) in the formation 110, as discussed further below. This encoding volume is located outside of the tool body and within the formation 110. Flow of formation fluid, induced for example by the tool pump module, is indicated by arrows 108. The fluid in the encoding volume may be drawn out of the formation 110 via the flow line 104 and into the tool body where the detection subsystem 102 is housed. The flow line 104 may transport fluid that originated in the encoding volume, and thus contains encoded spins, to the detection subsystem 102 where it may be analyzed, as discussed further below.

According to one embodiment, the encoding system 100 may comprise a magnet to generate a static magnetic field, $B_0$. In the example illustrated in FIG. 1, the encoding subsystem includes a magnet assembly that includes pad-shaped permanent magnets 114 that produce a magnetic field inside the formation 110. These permanent magnets may be made from any suitable magnetic material having a remanence magnetization which is relatively stable with respect to temperature. One example of a magnetic material that may be used is Samarium-Cobalt. The encoding subsystem 100 may be integrated with the downhole tool pump module, or may simply be located on or attached to the downhole tool. In one embodiment, the encoding subsystem may be mounted on a retractable arm 116 that can be extended away from the tool body to the wellbore wall 128. The magnet assembly may thus be constructed with an appropriately curved face to match the wellbore wall. However, it is to be appreciated that the invention is not limited to this construction for the encoding subsystem and encoding magnet assembly and many variations are possible, as would be recognized by those skilled in the art. For example, the magnets 114 may be simple dipole magnets or may be a more complex structure. According to another embodiment, rather than having the encoding subsystem generate a static magnetic field, the Earth's magnetic field may be used instead. The only requirement for the static field is that it encompasses the encoding volume and is present for a sufficient amount of time so that the spins in the encoding volume become aligned in a known manner.

The encoding subsystem magnet assembly projects a magnetic field into the formation 110 from one side of the wellbore 112, as shown in FIG. 1. As a result, this magnetic field is inevitably non-uniform over a large volume and some magnetic field gradient is thus expected. Lines 118 indicate one example of the magnetic field gradients that may be produced by the encoding subsystem magnet assembly. The encoding subsystem may also comprise RF coils 122 integrated with the magnet assembly. The RF coils are constructed to project an RF magnetic field with a non-zero component that is perpendicular to the static magnetic field. The frequency of the RF magnetic field may be tuned to the Lamor frequency of an element of interest (e.g., Carbon-13) for detecting the nuclear spins of that element. According to one embodiment, multiple RF coils may be used to select different regions within the formation and/or to tune to multiple Lamor frequencies, as discussed further below. In one example, the encoding magnet assembly may be similar to that used in conventional NMR logging tools, including, for example, the Schlumberger CMR and MR-Scanner tools.

According to one embodiment, the detector subsystem may be constructed such that the sample to be analyzed is completely within the detector assembly. For example, the detector subsystem may be constructed around the flow line 104, as shown in FIG. 1. Alternatively, the flow line may be fitted with a valve assembly and subsidiary flow line to divert some or all of the fluid sample from the flow line 104 into a detector that is located elsewhere in the tool body. The detector subsystem may include a sample chamber that may include the flow line or may be coupled to the flow line that holds the sample of fluid to be analyzed. Thus, unlike the encoding subsystem magnet assembly that may be designed to project a magnetic field into the wall of a wellbore to encode a sample that is completely outside of the encoding subsystem body, the detector may have a very different magnet assembly design because the sample may be within the detector subsystem body. In particular, in one embodiment, the detector magnet assembly may be constructed around the sample chamber, such that the sample to be analyzed is placed in the center of the magnet assembly. One advantage provided by having two such different encoding and detector subsystems is that the detector subsystem may be designed to have a highly uniform magnetic field or field with a known magnetic field gradient. In addition, because the volume into which the detector's magnetic field is projected is small (the interior of the detector body) compared to the formation into which the encoding subsystem projects its magnetic field, the field strength of the detector magnetic field may be much higher. For example, in some embodiments, the detector magnetic field strength may be close to one Tesla.

For a very uniform magnetic field, the detector magnet assembly may include, for example, the uniform magnet designs by Halbach [K. Halbach, Nuc. Inst. Methods 169, 1-10 (1980); K. Halbach, Nuc. Inst. Methods 187, 109-117 (1981)] or by the Neomax Corporation of Japan. With these or other similar magnet designs, the sample (and flow line) may be placed in the center of the magnet assembly. The detector subsystem may also include RF coils to generate RF magnetic pulses to manipulate the spins in the sample, as discussed above in reference to the encoding subsystem. In one embodiment, RF coils may surround the sample for good sensitivity. In another embodiment, multiple coils may be provided and tuned to different Lamor frequencies to allow detection of multiple nuclei, such as, for example, water protons and Carbon-13. According to one embodiment, the detector subsystem may also include magnetic field gradient coils to allow further analysis of the sample, as discussed below. Both the detector and encoding subsystems may also include electronics for controlling the components (e.g., to control generation of specific RF pulses etc.) and to provide power to all the components. Suitable control and power electronics are well known to those skilled in the art. In addition, it is to be appreciated that the detector subsystem may include a controller that includes hardware and software adapted to analyze the signals detected by the detector and provide, for example, time-of-flight data, as discussed below. Alternatively, a controller may be coupled to the detector subsystem, may receive data from the detector subsystem, and may process that data to provide indications of, for example, time-of-flight of encoded spins, fluid type or other characteristics of the fluid and/or the sample.

Figure 2:
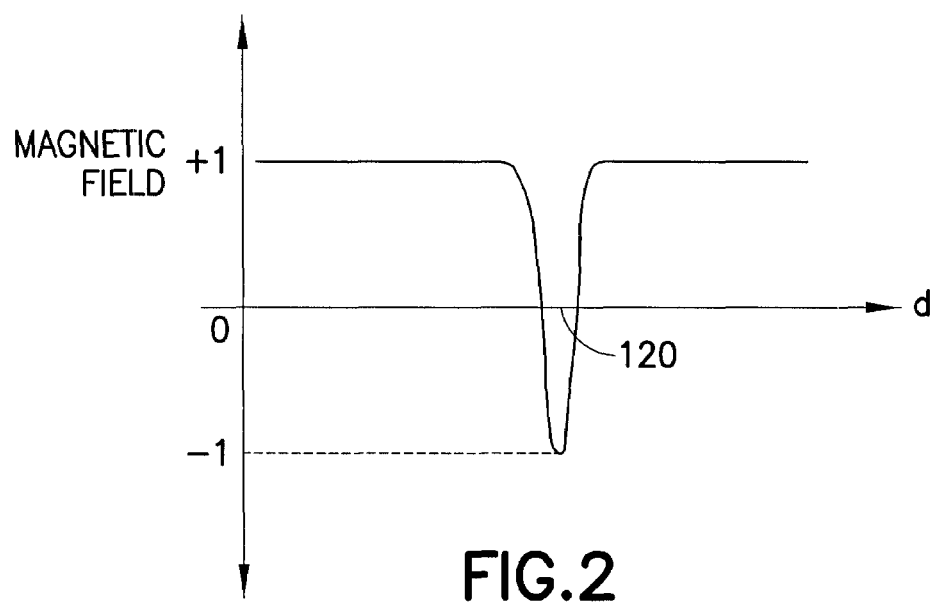
FIG. 2 is a diagram illustrating inversion of magnetic spins.

Referring again to FIG. 1, according to one embodiment, the RF coils 122 of the encoding subsystem magnet assembly may be tuned so as to apply a magnetic pulse to a specific slice in the formation, indicated by field line 120. The slice may be selected by tuning the RF coils and the encoding subsystem magnets. The strength magnetic field decays with distance into the formation (distance away from the encoding subsystem magnet assembly) according to a known relationship that is dependent on the type of rock and the frequency to which the RF coils are tuned. Thus, the encoding subsystem has a certain zone of sensitivity within the formation that is determined by the RF frequency. The encoding pulse, or pulse sequence manipulates the spins within the slice 120 of the encoding volume. For example, the encoding pulse or pulse sequence may include a 180° pulse to invert the spins within slice 120. This is shown schematically in FIG. 2 which illustrates a plot of normalized magnetic field polarization as a function of distance, d, into the formation (d=0 being defined as the wall of the wellbore). Where the slice 120 is in the region in which the spins are manipulated by the encoding magnet assembly may depend on the magnet design. The slice may be, for example, an arc or circle having a thickness of a few millimeters and extending along the length of the NMR antenna. As can be seen from FIG. 2, when an inversion pulse is applied to the encoding volume, the magnetic polarization of spins at the location of slice 120 are inverted by 180° degrees compared to the spins in the surrounding formation.

Figure 3:
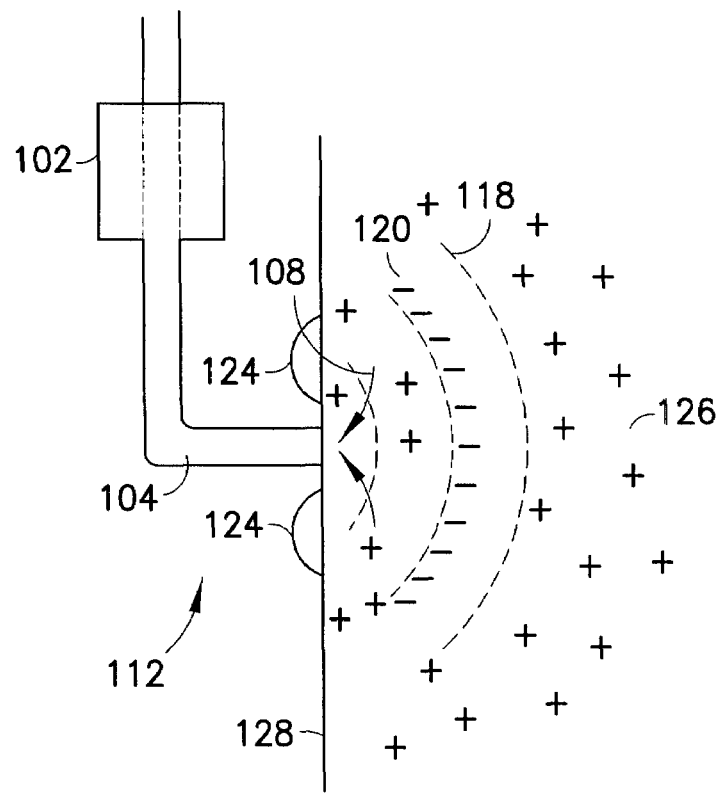
FIG. 3 is a diagram illustrating inversion of magnetic spins in a slice of a rock formation.

The effect of inversion encoding is shown schematically in FIG. 3. The encoding magnet assembly 124 emits an inversion pulse causing the spins along slice 120 to have a negative ("−") magnetization relative to the positive ("+") magnetization of the spins in the surrounding encoding volume 126. The inverted spins may then flow out of the formation (e.g., drawn by the pump action) through the flow line 104 and into the detector subsystem 102. As long as a substantial magnetic field exists along the flow path, the spin magnetization will follow the local field adiabatically and a significant amount of signal may be measured after the fluid arrives at the detector. In the detector subsystem, a train of RF detection pulses may be applied to detect, for example, a free induction decay signal after each pulse, as discussed in more detail below. Because the location of slice 120 is known because the magnetic field function in the formation is known, a measure of the time for the inverted spins to arrive in the detector subsystem ("time of flight") may provide an indication of the flow velocity of the fluid in the formation.

Figure 4:
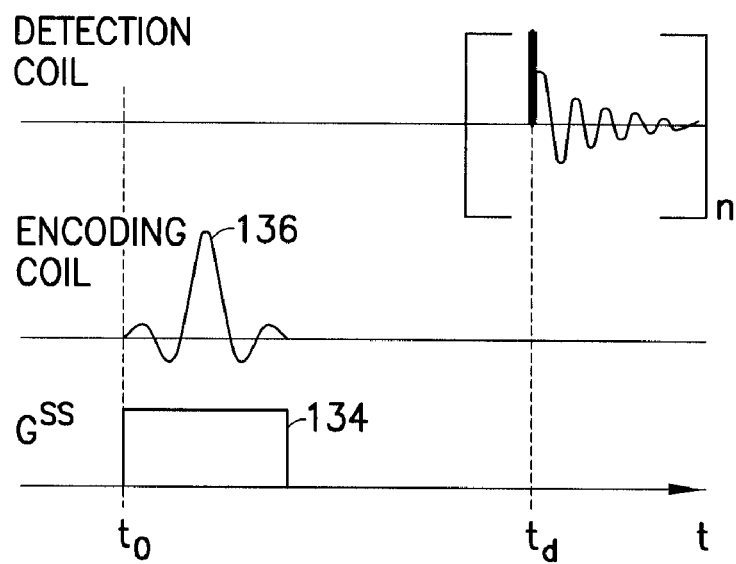
FIG. 4 is a diagram of one example of a magnetic pulse sequence that may be used for remote detection according to aspects of the invention.

Referring to FIG. 4, there is illustrated an example of a pulse sequence that may be used to measure flow velocity, according to one embodiment of the invention. At a start time of the NMR measurement, $t_0$, a static field may be applied by the encoding subsystem magnets. The static field, $B_0$, indicated in FIG. 4 by reference numeral 134, may have a field strength $G^{ss}$. In laboratory experiments with uniform magnetic fields, this field gradient is often applied by energizing a set of electromagnets with electrical currents. For the encoding system according to embodiments of the invention, a static field gradient may be produced by the magnet itself. Also at time $t_0$, the encoding subsystem RF coil may be activated (by the control electronics) to apply an encoding pulse 136. The encoding pulse 136 may be slice-selective, as discussed above. The detection subsystem magnets and RF coils may apply a train of detection pulses 138 to measure the signal as the encoded spins flow through the detection coil. The series of detection pulses may be generated continuously from $t_0$, so as to continuously monitor the fluid arriving at the detection subsystem, with an nth detection pulse beginning at a time, t, after $t_0$, as shown in FIG. 4.

Figure 5:
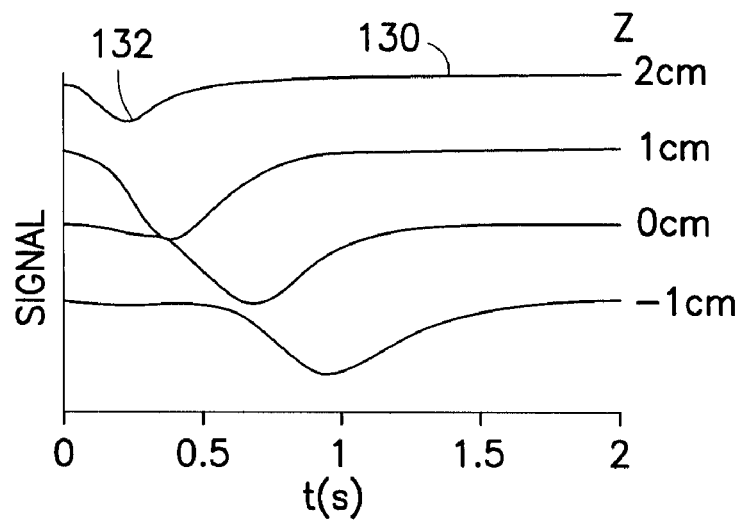
FIG. 5 is a plot of detected signal versus time illustrating time-of-flight data for a series of NMR measurements on a sample.

Referring to FIG. 5, there is illustrated example time of flight data obtained from remote detection NMR measurements of xenon gas flow through a rock sample in a laboratory. The time of flight data was obtained by inverting a thin slice in the rock sample at various locations, z, in the sample. In FIG. 5, the detected signal is represented on the vertical axis as a function of time after the inversion (time after encoding). The different lines 130 represent results from different measurements at different inversion positions, z (namely, z=2 cm, z=1 cm, z=0 cm and z=−1 cm). The dip 132 in each line 130 corresponds to the arrival of the inverted spins at the detector subsystem. As the inversion slice is moved further away from the detector subsystem (corresponding to smaller z), it takes longer for the inverted spins to arrive at the detector. Therefore, for smaller z, the dip 132 appears later in time. Fluid flow through the sample can thus be characterized by the time-of-flight of the spins from the time of encoding to the time when the spins reach the detector.

As discussed above, according to one embodiment, a finite magnetic field may be maintained for the entire trajectory of the flow from the encoding volume to the detector subsystem. When a spin moves in a spatially varying magnetic field, the local quantization direction and field value can be different. For example, when a spin is polarized along the local magnetic field at one instance, slow movement through a magnetic field whose direction is changing allows the spin change polarization to follow the direction of the local magnetic field. However, when movement of the spin through the local magnetic field is at high speed, or the local magnetic field gradient is large, the spin may not have enough time to follow the changing polarization direction of the local field, resulting in decoherence and reduction of the NMR signal. Such a situation is similar to a stationary spin experiencing a time-varying magnetic field, variance being in both the magnitude and direction of the field. When the frequency of the time-varying field is comparable to the local Lamor frequency, significant relaxation of the NMR signal may occur. The condition that should exist to avoid significant signal decay is called the adiabatic condition, described by the following equation:

$$\frac{|v \cdot gradB|}{|B|} < 0.1 \qquad (1)$$

Where "gradB" is the gradient of the magnetic field, B, and v is the velocity of the flowing fluid. When the condition stated in equation (1) is satisfied, the moving spins may generally follow the changing direction of the local magnetic field and may not suffer significant decay.

Passage of a spin through a zero or very low magnetic field region is one situation in which significant signal decay may occur. This is because of the very low Lamor frequency at close to zero field which makes it difficult to maintain the adiabatic condition except for extremely slow movement of the spins. Therefore, in at least some embodiments, it may be preferable to avoid zero (or near zero) magnetic field conditions along the entire flow path of the fluid. Accordingly, the encoding magnet assembly may be designed to avoid such zero or near-zero field conditions along the flow line between the encoding region and the detector subsystem.

Another mechanism that may cause loss of coherence in the signal is the spin lattice relaxation of the spins, since the flow from the encoding region to the detection region will invariably take some time. The decay of the encoded signal may take an exponential form, such as, $\exp(-t/T_1)$, where t is the transit time (time-of-flight between the encoding volume and the detector) and $T_1$ is the spin-lattice relaxation time of the formation fluid. As a result, it may be desirable to select an encoding region and flow velocity (which may be controlled by the pump module of the tool) that minimizes the transit time. In particular, it may be difficult to perform accurate time-of-flight measurements if the transit time is much larger than the spin-lattice relaxation time, due to significant signal decay. Furthermore, since the encoding magnetic field may be spatially dependent, and $T_1$ may be dependent on the magnetic field, the part of the fluid flow pathway with the shortest $T_1$ may dominate the signal decay. In many sedimentary rocks, $T_1$ of water protons is field dependent and is shorter when the field strength is lower. Therefore, this may provide an additional motivation to design the encoding magnet assembly so as to avoid zero or near-zero field along the flow path between the encoding region and the detector region.

Figure 6:
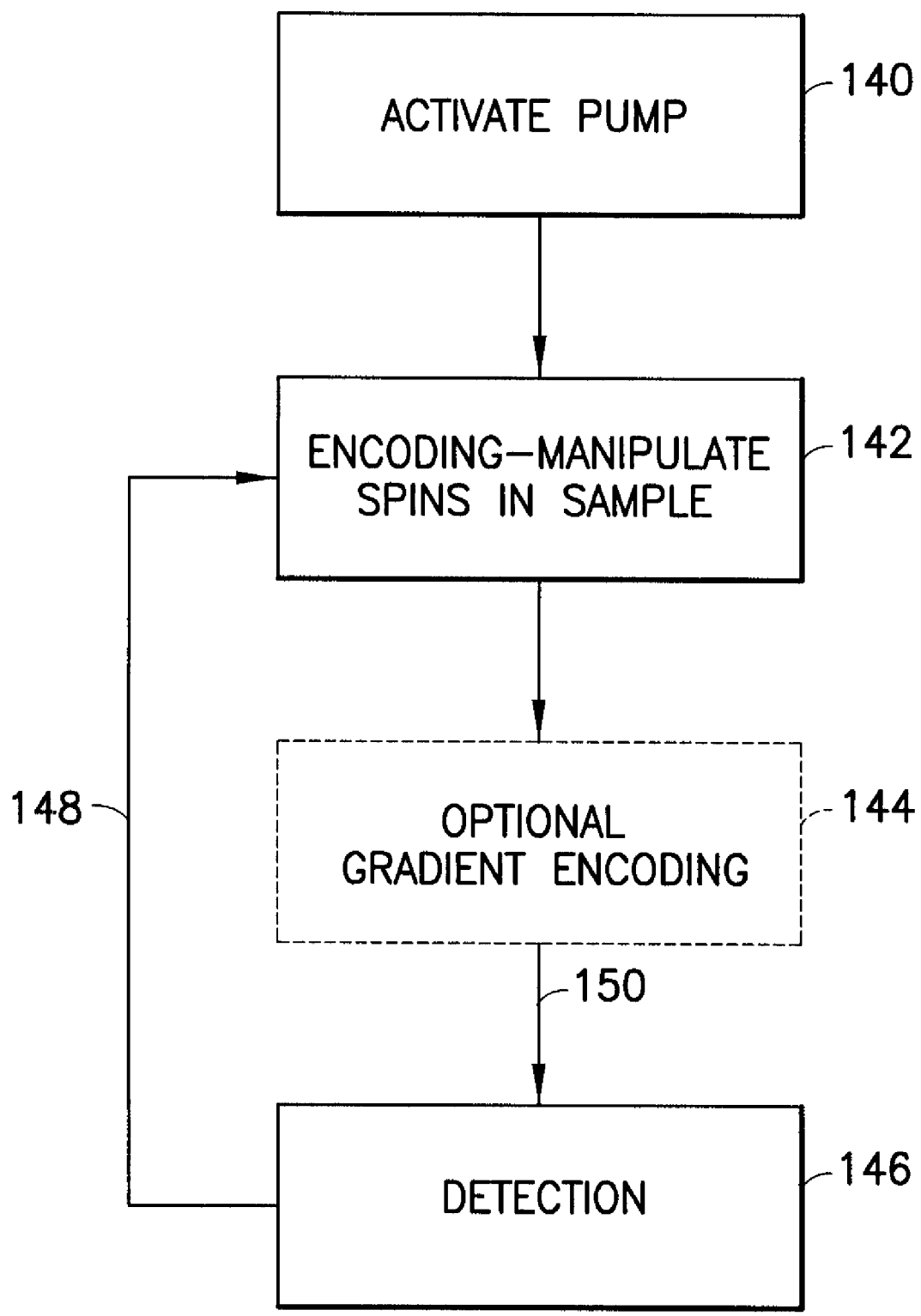
FIG. 6 is a flow diagram illustrating steps of a method of remote sensing NMR according to an embodiment of the invention.

Referring to FIG. 6, there is illustrated a flow diagram showing steps for one embodiment of a method of remote sensing NMR according to an embodiment of the invention. In a first step 140, a pump module may be activated to induce fluid flow in the sample. In a second step 142, the encoding step, the encoding subsystem may apply RF magnetic field pulses to the encoding volume, as discussed above. In one embodiment, the encoding subsystem may further include optional magnetic field gradient coils adapted to project a magnetic field gradient into the sample. These gradient coils may be, for example, similar to the flat coil design used in some NMR probes, as known to those skilled in the art. The gradient coils may allow further encoding within a selected slice of the encoding volume to allow more detailed analysis of the slice, e.g., with pulse magnetic field gradient measurements. If the encoding subsystem includes gradient coils, an embodiment of a measurement method may include an optional field gradient encoding step 144, as shown in FIG. 6. After the encoding step(s), the fluid containing the encoded spins may be transported to a second location in space which may be inside the detection subsystem, as discussed above. This transporting of the encoded spins is indicated by arrow 150 in FIG. 6. The detection subsystem may then apply a series of RF pulses to measure the signal in the detection step 146. The encoding step(s) and detection step may be repeated (indicated by arrow 148) with different NMR encoding parameters that will systematically change the encoding effects (e.g., tuning the encoding subsystem to select different slices within the sample, or tuning the encoding subsystem to different Lamor frequencies) to obtain comprehensive data about the sample, As discussed above, a consequence of remote detection is that the received signal is dependent on the flow pattern in the sample. Fluid from the far end of the sample during encoding may arrive at the detector later than fluid nearer to the detector. No signal may be detected from a stagnant region within the sample that is not connected to the flow field. Heterogeneity in the flow field may cause some flow paths to be preferred. This may be the result of structural heterogeneity present in some porous samples, for example, some rock formations. This structural heterogeneity in some rock formations may critically determine crude oil recovery efficiency and rate. Therefore, it may be highly desirable to obtain an indication of the structural heterogeneity in a formation. In particular, such heterogeneity may not be readily determined from a pore-level structural characterization of the formation that may be obtained from, for example, diffusion and/or transverse relaxation time measurements. By performing a series NMR measurements using an apparatus according to embodiments of the invention with different NMR parameters for the encoding system, detailed structural information about a formation may be obtained. For example, by tuning the encoding system so as to encode different regions or slices of the formation over a series of measurements, the resulting time-of-flight data may allow spatial resolution of the fluid within the formation. Thus, flow data obtained from remote sensing NMR measurements according to embodiments of the invention may provide very useful information for oil-bearing earth formations.

A benefit of remote detection is that a highly uniform magnetic field may be achieved for the sample within the tool body, for example, for a sample located in the center of the detector magnet assembly. As a result, various NMR measurements usually not possible or not accurate with conventional down-hole apparatus may be achieved. For example, with conventional downhole NMR apparatus a direct separation of fluid type based on chemical shift has not been possible due to poor signal-to noise ratio (caused by poor filling factor due to the fact that the sample is outside of the tool) and heterogeneities of the magnetic field, either due to susceptibility effects or inhomogeneities in the magnetic field of the tool magnet. With a remote sensing NMR apparatus according to embodiments of the invention, the detector may be optimized (e.g., with a highly uniform magnetic field) such that different fluids (e.g., water and oil) may be distinguished by their different chemical shift, J-coupling or other NMR parameters. In combination with the encoding subsystem, this may allow further characterization of fluid-specific flow in a formation. In particular, one highly desirable measurement that may be achieved with embodiments of a remote sensing NMR apparatus and method according to the invention is that of relative permeability.

Relative permeability is a measure of the permeability of a sample with respect to a particular fluid component contained within the sample. Many samples contain multi-phase fluids, i.e., fluids made up of more than one component, e.g., a fluid containing both oil and water. Crude oil-bearing formations almost always contain multi-phase fluids. One example of such multi-phase fluid is a fluid that is a mixture of crude oils, water, and natural gases. These components are immiscible (although natural gases may dissolve in crude oils in certain environmental conditions) and their movement in a porous rock can be complex. As a result, such a fluid may give rise to a complex flow distribution. Each phase of the multiphase fluid may occupy its own pore space in the formation and the flow of one phase may be restricted by the presence of another phase. As a result, the permeability of the formation with respect to an individual phase, called the relative permeability, depends on the relative saturation of the phases and the overall porosity and permeability of the formation. For example, the relative permeability of a formation with respect to oil is dependent on the percentage oil saturation in the formation. If the formation contains a high degree of water, even if the rock is highly porous, the relative permeability for oil may still be fairly low due to the fact that a majority of the flow space may be taken up by the water.

Relative permeability may be an important parameter of a formation because it may directly impact the difficulty of extracting oil from the formation and also the economic value of the formation. In one example, because the detection subsystem uses a separate magnet assembly, and because the sample may be analyzed entirely within the detection subsystem as discussed above, sufficient resolution may be obtained to detect individual fluid components (phases) using, for example, chemical shift measurements, as known to those skilled in the art. Such measurements may provide an indication of the relative saturation of the selected phase (e.g., oil), which when combined with the flow data may provide a measure of relative permeability. By obtaining an overall flow geometry using multiple NMR measurements with the encoding subsystem adapted to encode different slices or regions in the sample, then distinguishing different fluid components (e.g., by chemical shift, diffusion or relaxation measurements), chemically resolved flow geometry may be obtained for the formation.

In addition, in the case of multi-phase fluids in the formation, the flow of the flow of the individual phases may be different from each other, giving rise to complex flow patterns. In particular, the volume flow velocity of a phase may be proportional to the relative permeability for that phase. As a result, the fluid phase with a higher relative permeability may exhibit a fast linear velocity and the fluid with a lower relative permeability may travel slower. The faster fluid may travel the distance from the encoding region to the detection region in shorter time than does the slow fluid, resulting in two arrival fronts. In one embodiment, such a flow pattern will be measured by the detection sub-system as two subsequent valleys or dips in the plot of the signal as a function of transit time. These two valleys may indicate the arrival of the two phases. Thus, the time-of-flight measurements discussed above may be used to directly measure the velocity of the individual phases.

Mathematically, the flow velocity $\vec{v}_i$ of the $i^{th}$ component of a multi-phase fluid is given by Darcy's law:

$$\vec{v}_i = -\frac{kk_i}{\mu_i} gradp \quad (2)$$

where: k is the overall permeability (a property of the formation rock);

$k_i$ is the relative permeability for the $i^{th}$ component;

$\mu_i$ is the viscosity of the $i^{th}$ component; and gradp is the pressure gradient.

It will be appreciated that in equation (2), the surface tension effect between the different component fluids has been ignored; however, the effect may be incorporated as in any standard treatment, as known to those skilled in the art.

Assume that the pressure of the formation is $p_f$ at a distance $r_f$ and that the pressure of the borehole with a radius $r_o$ is $p_b$.

Then, the flow due to a one-dimensional pressure gradient is given by:

$$\vec{v}_i = -\frac{kk_i}{\mu_i}\frac{p_f - p_b}{r_f - r_0} \quad (3)$$

With the same assumptions, the radial flow in a cylindrical symmetry is given by:

$$\vec{v}_i = -\frac{kk_i}{\mu_i}\frac{p_f - p_b}{r \ln(r_f/r_0)} \quad (4)$$

With the same assumptions, the radial flow in a spherical symmetry is given by:

$$\vec{v}_i = -\frac{kk_i}{\mu_i}\frac{p_f - p_b}{r^2(r_0^{-1} - r_f^{-1})} \quad (5)$$

It can be seen from the above that the measurement of flow velocity may be used to distinguish flow regimes by its radial dependence and also used to determine permeability and relative permeability. For example, the local pressure gradient may be determined by two pressure measurements at nearby locations. At the same time, NMR measurements as described above may be used to determine the flow velocity between the two locations where the pressure measurements were taken. The one-dimensional formula, equation (3), may then be used to extract $kk_i/\mu_i$.

A variety of measurements may be made with embodiments of remote sensing NMR apparatus according to the invention to determine various characteristics of a sample. For example, to obtain a measure of flow velocity in a formation, the spins in a slice of the encoding volume at a known distance from the wellbore wall may be inverted and the resulting signal detected to obtain a measure of flow velocity, as discussed above. One or several regions (or slices) in the encoding volume may be selected using a combination of field gradients and RF pulses (including the use of multiple RF coils, as discussed above) and the resulting signals detected and analyzed to obtain two-dimensional flow information. In another embodiment, spins the entire encoding volume may be encoded using a combination of gradient and RF pulses, and the resulting signals detected and analyzed to obtain three-dimensional imaging of the flow field in the sample. According to one embodiment, to obtain a measure of relative permeability, flow velocity, and optionally preferred flow channels and other structural information about a formation, may be collected as discussed above. Then, in the detection step, further NMR measurements may be performed on the fluid to detect a particular phase of the fluid. For example, the flow of the oil phase alone may be detected by tuning the detection subsystem to detect Carbon-13. The signal from water alone may then be determined by relaxation contrast, as known to those skilled in the art. In addition, other NMR measurements, such as diffusion and/or relaxation time measurements may be performed by the detector subsystem to obtain additional information about a sample.

These and other NMR measurements incorporating remote detection may have many applications in well-logging and other fields. For example, measuring the in-flow from different regions of a formation may facilitate testing of theoretical flow patterns in rock formations and to validate theoretical bases for contamination monitoring using other wellbore tools, such as, for example, the Schlumberger MDT tool. Analysis of fluid from a particular region within a formation (which may be done by selecting flow from the particular region, e.g., by placement of the flow line and/or control of the pump module) may facilitate better characterization of formation fluid and better contamination estimates. In another example, fluid from different regions in a formation may be analyzed to characterize composition of the formation.

In another embodiment, systematic flow velocity measurements over a region of a formation may be used to examine flow field isotropy as a means of detecting rock heterogeneity. Many types of heterogeneity may exhibit a significant dispersion of the flow. The arrival time of fluids from different flow pathways may be very different. For example, the fluids in the high permeability channels (or regions) may exhibit much high flow velocity than those fluids in the tighter flow path with low permeability. Regions with smaller pores, such as micropores in many carbonate rocks or dead-end pores, may contribute little to the flow. Accordingly, flow measurements such as those discussed herein may be able to measure the transit time distribution and thus determine the fraction of the total pore space (or porosity) that contributes to flow and the fraction that does not contribute to the flow. The fraction of porosity that does not contribute to flow is often called bound fluid and may be estimated from conventional (non-flowing) NMR measurements using the transverse longitudinal relaxation time, $T_2$. However, such estimates are in fact a correlation with a static measurement that does not involve moving the fluid, and thus may be prone to error. For example, short $T_2$ can be a result of a strong surface relaxivity and it is not exclusively due to small pore sizes. In comparison, the flow measurements discussed herein are a direct measurement of the flow distribution and the bound fluid fraction can be obtained directly. Thus, for example, flow velocity measurements may be used to detect cracks and channels as well as layering, porosity and/or permeability variation within rock formations. This may be particularly useful to identify very fast flowing channels or areas of high porosity and/or permeability within the formation which in turn may be useful to guide planning for exploitation of an oil (or other useful fluid) reservoir.

In one embodiment, the presence of a stagnant fluid means that not all of the encoded signal will arrive at the detector and, therefore, will not contribute to the detected valleys. Integration of the area of the valleys may be a direct measure of the volume of the fluid that has moved from the encoding region to the detection. The ratio between this integral and the total porosity measured by other NMR techniques may be used to obtain the movable water fraction. The bound water fraction is then given by one minus the movable water fraction.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only. It is to be appreciated that the invention is not limited to the specific examples described herein and that the principles of the invention may be applied to a wide variety of applications and incorporated into many different embodiments. The scope of the invention should be determined from proper construction of the appended claims and their equivalents.

What is claimed is:

1. A down-hole remote sensing nuclear magnetic resonance apparatus comprising:
an encoding subsystem including an encoding magnet assembly constructed and arranged to project an encoding magnetic field into an earth formation to encode nuclear spins in the earth formation, such that the encoding magnetic field is a non-uniform static magnetic field; and
a detector subsystem that is spatially separated from the encoding subsystem, the detector subsystem including a detector magnet assembly constructed and arranged to generate a magnetic field;
wherein the detector subsystem comprises at least one RF coil coupled to the magnet assembly; and
wherein the detector subsystem is constructed and arranged to generate a series of RF magnetic pulses to detect the encoded nuclear spins.

2. The down-hole remote sensing nuclear magnetic resonance apparatus as claimed in claim 1, wherein the encoding subsystem comprises at least one radio frequency (RF) coil coupled to the encoding magnet assembly; and wherein the encoding subsystem is constructed and arranged to generate an RF magnetic field having a non-zero component that is perpendicular to the static magnetic field.

3. The down-hole remote sensing nuclear magnetic resonance apparatus as claimed in claim 2, wherein the detector subsystem comprises a sample chamber that is constructed and arranged to hold a sample containing the encoded nuclear spins; and wherein the detector magnet assembly is constructed and arranged to generate a substantially uniform magnetic field in the sample chamber.

4. The down-hole remote sensing nuclear magnetic resonance apparatus as claimed in claim 2, wherein the detector magnet assembly is constructed and arranged to generate inside the sample chamber a magnetic field having a known magnetic field gradient.

5. A down-hole tool comprising:
The down-hole remote sensing nuclear magnetic resonance apparatus as claimed in claim 3;
a flow line that passes through the sample chamber; and
a pump module constructed and arranged to induce flow of the fluid from the formation through the flow line to the detector subsystem.

6. The down-hole remote sensing nuclear magnetic resonance apparatus as claimed in claim 1, wherein the encoding subsystem further comprises a pulsed field gradient module.

7. The down-hole remote sensing nuclear magnetic resonance apparatus as claimed in claim 1, wherein the detector subsystem further comprises a pulsed field gradient module.

8. A method of downhole remote sensing nuclear magnetic resonance measurement using a well logging tool adapted for positioning in a wellbore, the well logging tool carrying encoding subsystem having an encoding magnet assembly, the method comprising:
encoding at a first location nuclear spins in fluid in an encoding volume of a sample to provide encoded spins using the encoding magnet assembly, such that the encoding magnet assembly is constructed and arranged to generate a non-uniform static magnetic field;
transporting the fluid containing the encoded spins to a second location remote from the first location;
detecting the encoded spins at the second location; and
determining a flow velocity of the fluid based on a time taken for the encoded spins to travel from the encoding volume to the second location.

9. The method as claimed in claim 8, wherein encoding includes generating a magnetic field to encode the nuclear spins.

10. The method as claimed in claim 9, wherein the first location is an earth formation and wherein encoding further includes projecting the magnetic field into the earth formation to encode the nuclear spins in the fluid in the encoding volume of the earth formation.

11. The method as claimed in claim 10, wherein transporting includes inducing flow of the fluid in the earth formation.

12. The method as claimed in claim 11, wherein detecting includes generating a series at radio frequency magnetic pulses to detect the encoded spins.

13. The method as claimed in claim 12, wherein the second location is a sample chamber within a detector that generates the series of radio frequency magnetic pulses, and wherein detecting further comprises generating a substantially uniform magnetic field surrounding the encoded spins in the sample chamber.

14. The method as claimed in claim 8, wherein encoding includes generating a radio frequency magnetic field at a Lamor frequency selected to encode nuclear spins within a selected slice of the encoding volume.

15. The method as claimed in claim 14, wherein encoding further comprises generating magnetic gradient pulses to further encode the nuclear spins within the selected slice.

16. A method of measuring flow velocity of a fluid in an earth formation using an encoding subsystem having an encoding magnet assembly, the method comprising:
inducing the flow of the fluid;
encoding nuclear spins in the fluid within an encoding volume of the earth formation to provide encoded spins using the encoding magnet assembly, such that the encoding magnet assembly is constructed and arranged to generate a non-uniform static magnetic field;
causing the fluid containing the encoded spins to flow from the earth formation through a flow line to a detector;
detecting the encoded spins at the detector by generating a series of radio frequency magnetic pulses to detect the encoded spins; and
determining the flow velocity by determining a time taken for the encoded spins to arrive at the detector.

17. The method as claimed in claim 16, wherein encoding includes generating a magnetic field to invert the nuclear spins in the encoding volume.

18. The method as claimed in claim 16, wherein encoding includes generating a radio frequency magnetic field at a Lamor frequency selected to encode the nuclear spins within a selected slice within the encoding volume.

19. The method as claimed in claim 18, further comprising repeating the encoding, causing and detecting steps for different Lamor frequencies.

20. The method as claimed in claim 16, further comprising deriving additional information from the flow velocity.

21. The method as claimed in claim 20, wherein the fluid is a multi-phase fluid that includes water, and wherein the additional information comprises at least one of a permeability of the encoding volume of the earth formation, a movable water fraction, a bound water fraction, and a relative permeability for at least one phase of the multi-phase fluid.

22. An oilfield application tool adapted for positioning in a subterranean environment, the oilfield application tool carrying at least one magnet assembly, a first remote detection nuclear magnetic resonance subsystem and a second remote detection nuclear magnetic resonance subsystem, the oilfield application tool comprising:

an encoding magnet assembly of the at least on magnet assembly is in communication with the first remote detection nuclear magnetic resonance subsystem, is constructed and arranged to project an encoding magnetic field into an earth formation of the subterranean environment to encode nuclear spins in the earth formation, such that the encoding magnetic field is a non-uniform static magnetic field; and a detector subsystem of the second remote detection nuclear magnetic resonance subsystem is spatially separated from the first remote detection nuclear magnetic resonance subsystem, the detector subsystem including a detector magnet assembly constructed and arranged to generate a magnetic field;

wherein the detector subsystem comprises at least one RF coil coupled to the detector magnet assembly; and wherein the detector subsystem is constructed and arranged to generate a series of RF magnetic pulses to detect the encoded nuclear spins.

23. A method of downhole remote sensing nuclear magnetic resonance measurement using an oilfield application tool adapted for positioning in a subterranean environment, the oilfield application tool carrying at least one magnet assembly, a first remote detection nuclear magnetic resonance subsystem and a second remote detection nuclear magnetic resonance subsystem, the method comprising:

encoding at a first location nuclear spins in fluid in an encoding volume of a sample to provide encoded spins using an encoding magnet assembly of the at least on magnet assembly that is in communication with the first remote detection nuclear magnetic resonance subsystem, such that the encoding magnetic field is a non-uniform static magnetic field; and transporting the fluid containing the encoded spins to a second location remote from the first location;

detecting the encoded spins at the second location using a detector subsystem of the second remote detection nuclear magnetic resonance subsystem; and determining a flow velocity of the fluid based on a time taken for the encoded spins to travel from the encoding volume to the second location.

\* \* \* \* \*